March 20, 1956 H. E. F. C. LINGENBRINK 2,739,197
TURN SIGNAL SWITCH
Filed July 18, 1952 2 Sheets-Sheet 1
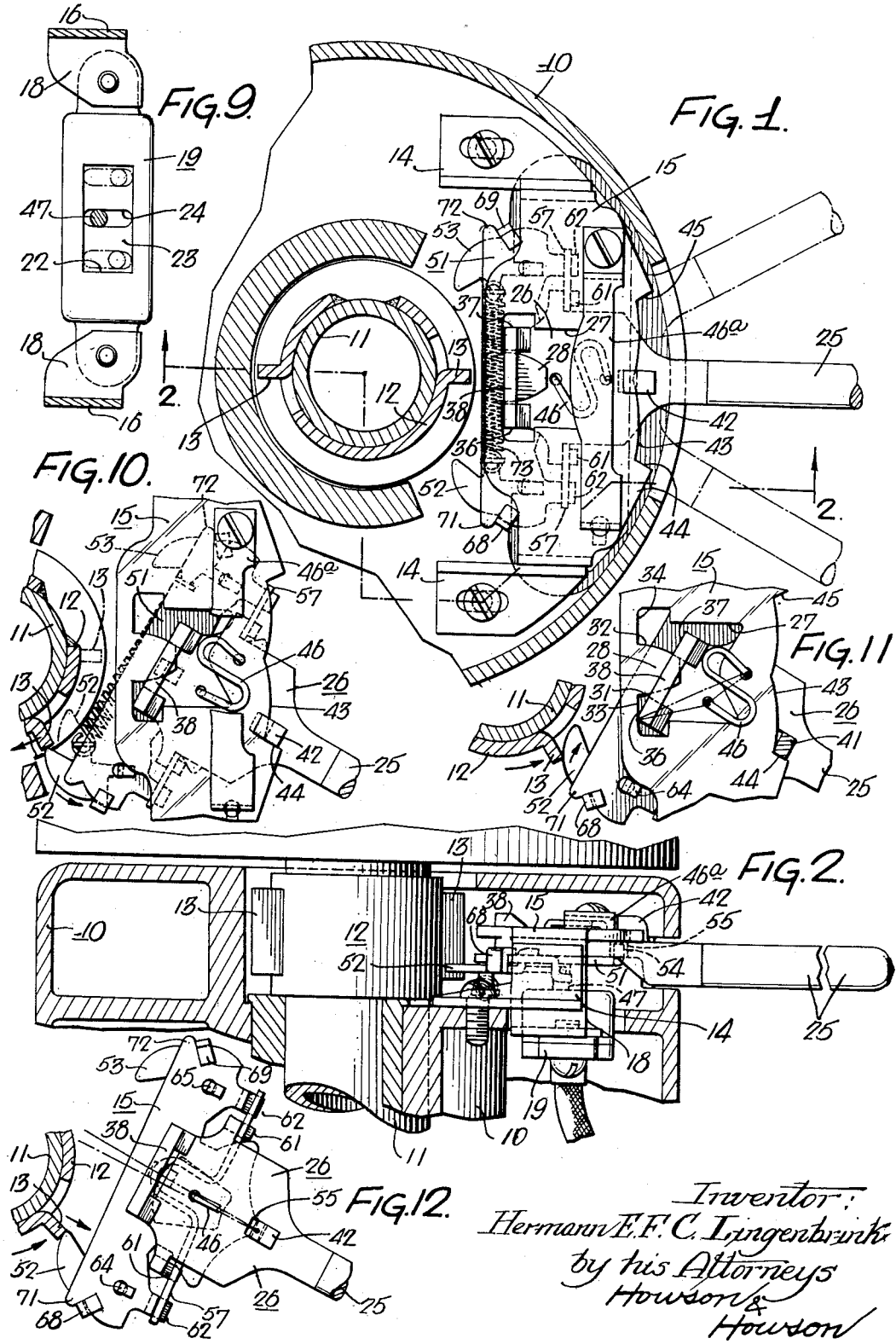
Inventor:
Hermann E. F. C. Lingenbrink
by his Attorneys
Howson & Howson

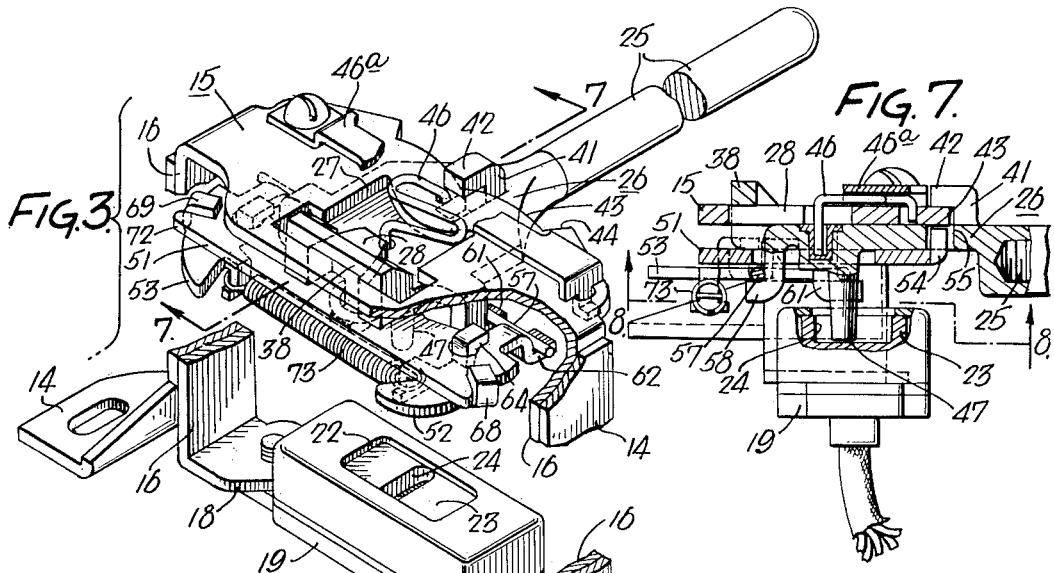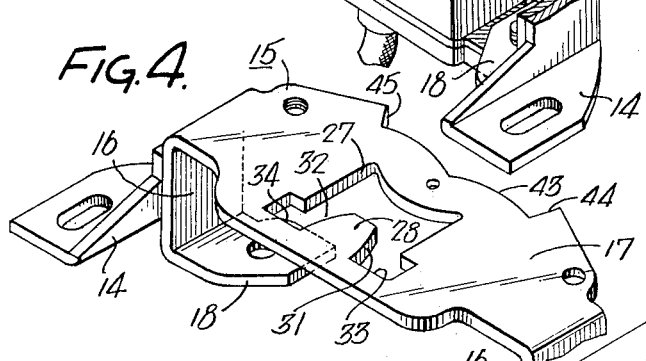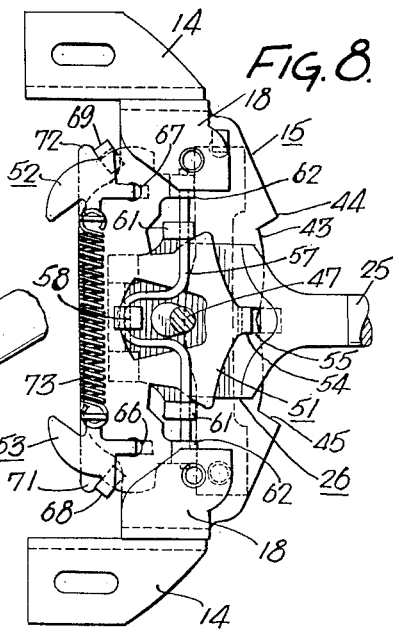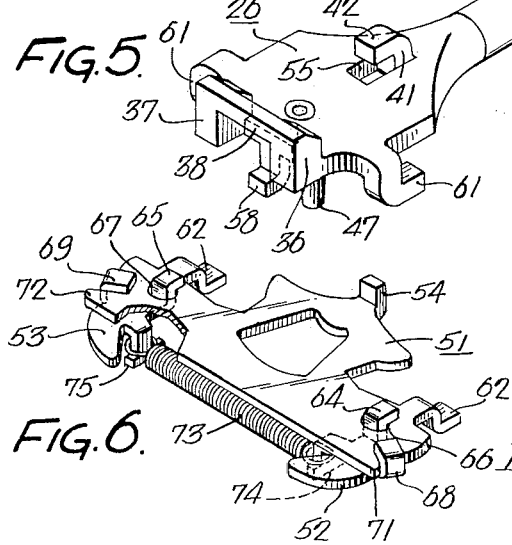

United States Patent Office 2,739,197
Patented Mar. 20, 1956

2,739,197

TURN SIGNAL SWITCH

Hermann E. F. C. Lingenbrink, Hilltown, Pa., assignor to United Specialties Company, Philadelphia, Pa., a corporation of Delaware Application July 18, 1952, Serial No. 299,596

12 Claims. (Cl. 200—61.34)

The present invention relates to new and useful improvements in switch mechanisms adapted for use in conjunction with direction indicating signal systems for automobiles and like vehicles, and more particularly to improvements in switch mechanisms wherein the direction signal is set manually prior to making a turn, remains set while making the turn, and is automatically cancelled upon the resumption of a straight course after the turn has been made.

The principal object of the present invention is to provide a novel switch mechanism of the type described embodying various improved features of construction and operation.

Another object of the present invention is to provide novel directional signal switch mechanism which may be manually moved from a central "off" position to a right or left hand "on" posiiton and remain in its set position while a turn is being made, and be automatically returned to the central "off" position upon resumption of a straight course.

Another object of the present invention is to provide novel directional signal switch mechanism which is yieldably maintained in the "on" positions so if the switch mechanism is held or jammed in the "on" position it will not interfere with the turning of the vehicle.

A further object of the present invention is to provide novel switch mechanism which is of relatively compact construction and capable of being installed readily on an automobile or like vehicle.

A still further object of the present invention is to provide novel directional signal switch mechanism which is of relatively simplied construction and entirely efficient and effective in operation and use.

These and other objects of the present invention and the various features and details of the operation and construction theerof are hereinafter more fully set forth and described with reference to the accompanying drawings, in which:

Fig. 1 is a fragmentary transverse sectional view through the steering post of a vehicle having a turn signal switch made in accordance with the present invention incorporated therein;

Fig. 2 is a sectional view taken on line 2—2, Fig. 1 illustrating the means for mounting the turn signal switch of the present invention on the steering post;

Fig. 3 is an exploded perspective view partially in section illustrating the construction of the switch mechanism of the present invention;

Fig. 4 is a fragmentary perspective view of the mounting plate for the switch mechanism;

Fig. 5 is a perspective view of the rotor plate;

Fig. 6 is a perspective view of the pawls and pawl plate used in the switch mechanism of the present invention;

Fig. 7 is a transverse sectional view through the switch mechanism of the present invention;

Fig. 8 is a bottom plan view taken on line 8—8, Fig. 7;

Fig. 9 is a plan view of the electrical switch used in conjunction with the turn signal switch mechanism illustrating the central "off" position and the right and left-hand "on" positions;

Fig. 10 is a fragmentary plan view partially in section illustrating the turn signal switch mechanism moved to indicate a right-hand turn and shows the displacement of the pawl during clockwise rotation of the steering column;

Fig. 11 is a fragmentary plan view similar to Fig. 10 illustrating the cancelling of the switch mechanism during counter-clockwise rotation of the steering column; and Fig. 12 is a fragmentary plan view similar to Fig. 10 illustrating the resilient displacement of the pawl plate during counter-lockwise rotation of the steering column when the switch mechanism is jammed or held in the "on" position indicating a right-hand turn.

Referring more specifically to the drawings and particularly Figs. 1 and 2 thereon, reference numeral 10 designates generally a housing for the switch mechanism which surrounds a steering column or post 11 of an automobile or like vehicle. A cancelling ring 12 is secured to the upper portion of the steering column 11 and has a plurality of radially extending lugs 13 thereon which are adapted to engage and cancel the switch mechanism, as more fully described hereinafter.

Positioned inwardly of the housing 10 and fixedly secured thereto is a pair of upwardly extending brackets 14, 14 which carry a mounting plate 15 therebetween. The mounting plate 15 is configurated as shown in Fig. 4 and comprises a pair of side walls 16, 16 a flat upper surface 17 and a pair of inwardly extending arms 18, 18 formed as integral parts of the side walls 16, 16. An electrical switch 19 is mounted between inwardly extending arms 18, 18 and is adapted to be actuated by the turn signal switch mechanism to inidicate a right or left hand turn. An elongated slot 22 is provided in the upper surface of the casing for the switch 19 and exposes a sliding switch plate 23. A groove 24 extends transversely of the switch plate 23 and is adapted to be engaged by a portion of the turn signal switch mechanism. When the switch plate 23 is in its central positions, as shown in Figs. 3 and 9 the circuit to the directional signal lights is open. Moving the switch plate to the right with respect to Fig. 3 or downwardly with respect to Fig. 9 to the position indicated in broken lines will energize the right-hand directional signal light. Similarly, moving the plate to the extreme opposite position will close the circuit to the left-hand directional signal light.

Referring now to the switch operating mechanism, an operating lever 25 extends outwardly beyond the housing 10 and is adapted to be actuated from a central neutral or "off" position to right and left-hand "on" positions wherein the right or left-hand directional signal lights are energized. The operating lever 25 is fixedly secured to a rotor plate 25 (see Fig. 5) mounted interiorly of the housing on the mounting plate 15 for pivotal movement about a pair of pivot points upon actuation of the operating lever 25.

With reference to Figs. 1, 3 and 4 the mounting plate 15 has an opening 27 in its upper surface defining an inwardly extending tongue 28 centrally thereof. Arcuate cam surfaces 31 and 32 are provided along opposite side edges of the tongue 28 for the purpose of guiding or directing the pivotal movement of the rotor plate 26. Flat surfaces 33 and 34 are provided along the edge of the opening 27 adjacent each side of the tongue 28 and serve as pivot points about which the rotor plate 26 pivots, as more fully described hereinafter.

As shown in Fig. 5, the rotor plate 26 has a pair of upwardly extending projections 36 and 37 on its forward or inner surface and an integral connecting member 38 extends between the upper ends of the projections 36 and 37. This construction forms an opening at the forward end of the rotor plate 26 which is adapted to receive the tongue 28. A lug 41 is displaced upwardly from the rotor plate 26 adjacent the rear surface thereof and terminates in a forwardly extending finger portion 42. The rotor plate 26 is mounted beneath the mounting plate and the tongue of the mounting plate extends through the opening in the forward end of the rotor plate formed by the projections 36 and 37 and the connecting member 38 while the lug 41 and forwardly extending finger portion 42 engages the rear surface of the mounting plate.

A cam surface 43 is formed on the rear surface of the mounting plate which is engaged by the lug 41 and terminates at its outer ends in a pair of stops 44 and 45 which limit relative movement of the rotor plate with respect to the mounting plate. It is readily apparent that this construction provides for three limit positions of the rotor plate with respect to the mounting plate. There is the central neutral or "off" position wherein the upwardly extending projections 36 and 37 on the rotor plate 26 engage the surfaces 33 and 34 respectively formed by the opening 27 in the mounting plate. There also are right and left limit positions of the rotor plate 26 with respect to the mounting plate 15. These extreme limit positions are defined by the stops 44 and 45.

Upon actuation of the rotor plate 26 to its right hand or clockwise limit position, with respect to Fig. 1, the rotor plate pivots about the mounting plate on the forward surface of the projection 36, as shown in Fig. 11, and the interior surface of the projection 37 slides along the arcuate cam surface 32 on the tongue 28. In a similar manner, actuating the rotor plate to its left or counter-clockwise position will cause the rotor plate to pivot about the projection 37 and the interior surface of the projection 36 will engage the arcuate cam surface 31 on the tongue 28. The lug 41 will engage the stops 44 and 45 respectively in the right and left limit positions.

Means are provided to yieldably maintain the rotor plate 26 in its "on" or "off" positions. In the present instance this comprises an S-shaped detent compression spring 46 which interconnects the rotor plate 26 with the mounting plate 15. As shown by the broken lines in Fig. 11 the spring 46 will be compressed the greatest amount midway between the neutral position and the "on" positions. The detent spring will have to be forced over-center upon movement to or from the right and left-hand limit positions and thus the rotor plate may be forceably moved to or from these positions but normal vibration or a slight pressure will not change the position of the rotor plate. The spring 46 has one end anchored to the mounting plate and the other end secured to the rotor plate. Upon movement of the rotor plate to an "on" position, the end of the spring secured to the rotor plate must pass over a line interconnecting the anchor point of the spring with the pivot for the rotor plate and thereby exerts force on the rotor plate in a direction outwardly beyond the pivot point resiliently maintaining the rotor plate against a stop in an "on" position. A hold-down plate 46a secured to the mounting plate and positioned above the spring 46 prevents upward displacement thereof.

Projecting downwardly from the lower surface of the rotor plate is a lug 47 which engages the groove 24 in the electrical switch 19 and causes actuation of the switch upon movement of the rotor plate. In the neutral position of the rotor plate the switch plate 23 is maintained in its central or "off" position. Movement of the rotor plate 26 to its right or left-hand limit positions will cause similar movement of the switch plate 23 and thus actuate the desired directional signal light.

Resiliently carried by the rotor plate 26 is a pawl plate 51, configured as shown in Fig. 6, which carries a pair of pawls or actuator elements 52 and 53 at its opposite ends. The pawl plate 51 is resiliently urged forward with respect to the rotor plate toward the center of the steering column. A lug 54 projects upwardly from the extreme rear end portion of the pawl plate 51 and is adapted to be received in an opening 55 in the rotor plate 26. The pawl plate 51 may pivot about the lug 54 when it is necessary to prevent jamming of the directional signal switch mechanism. A spring 57 reacting on the pawl plate 51 and rotor plate 26 normally urges the pawl plate forward with respect to the rotor plate. The central portion of the spring 57 is engaged in front of a downwardly and forwardly extending finger portion 58 centrally of the rotor plate, while the extreme end portions of the spring engage downwardly and rearwardly extending lugs 61, 61 on the rotor plate and similarly configured lugs 62, 62 on the pawl plate. By this construction either end of the pawl plate may be resiliently displaced rearwardly with respect to the rotor plate thereby pivoting the pawl plate about the lug 54.

At each side of the pawl plate 51 are the rotably mounted pawls or actuator elements 52 and 53. The pawls 52 and 53 have upwardly extending projections 64 and 65, respectively, at the rear surface thereof which extend through openings 66 and 67 in the pawl plate and the pawls may be rotated with respect to the pawl plate about these projections 64 and 65. Positioned at the outer side edge of each pawl 52 and 53 are finger portions 68 and 69, respectively, which engage the side edges of the pawl plate 51 and normally bear against stops 71 and 72. The stops 71 and 72 extend outwardly from the forward portion of the side edges of the pawl plate 51. A coil spring 73 is provided which is connected to downwardly projecting lugs 74 and 75 formed as integral parts of the pawls 52 and 53, respectively. The lugs 74 and 75 are positioned forwardly of the pivots 64 and 65 for the pawls and thus the coil spring 73 normally urges the forward end portion of the pawls inwardly toward each other, as shown in Fig. 6.

In the neutral or "off" position of the mechanism the lugs 13 secured to the cancelling ring 12 are adapted to clear the pawls or actuator elements of the directional signal switch mechanism. When the directional signal switch mechanism is actuated to indicate a right-hand turn, as shown in Fig. 10, the one pawl 52 is positioned in the path of travel of the lugs 13. As the steering wheel is turned to make a right-hand turn with the mechanism in its right-hand position, the lugs 13 contact the inner edge of the pawl 52 and cause the pawl to rotate against the pressure of the coil spring 73, as shown in Fig. 10. Thus the lugs 13 are able to be moved during clockwise rotation of the steering wheel without changing the position of the pawl plate or rotor plate when they are in the position indicating a right-hand turn.

After the right-hand turn has been made, and the vehicle straightened out by a counter-clockwise turn of the steering wheel, one of the lugs 13 will contact the pawl 52, as shown in Fig. 11, and force the pawl plate and rotor plate to the neutral position thereby automatically discontinuing the signal and resetting the switch for further use. During the return motion of the steering wheel the pawl 52 is prevented from moving with respect to the pawl plate by means of the stop 71 on the pawl plate.

Also, by this construction and arrangement of the switch mechanism it will be seen that with directional signal switch mechanism set as aforesaid for a right-hand turn, should the vehicle be turned to the left in a direction contrary to that indicated by the signal, the initial left-hand turning of the steering wheel will operate to quickly cancel the incorrect signal.

It is apparent that in the case of setting the mechanism for indicating a left hand turn, the operation of the device is the same as that set forth above except that the opposite pawl or actuator element 53 is involved, and the various operations are effected by movements of the steering wheel in directions opposite to those given for the right-hand signal position of the set device.

Should the rotor plate be jammed or held in the "on" position while the vehicle is being straightened the pawl plate will be rotated about the pivot point 54, as previously described, against the pressure of the spring 57 thus allowing the steering wheel to turn without interference.

From the foregoing, it will be observed that the present invention provides a novel directional signal switch for automobiles or like vehicles embodying novel features of construction and operation. The present invention also provides a novel directional signal switch having considerably fewer moving parts than those presently in use thus making it more compact, more fool-proof in operation and easier to manufacture.

While a particular embodiment of the present invention has been illustrated and described herein it is not intended to limit the invention to such a disclosure and changes and modifications may be incorporated and embodied therein within the scope of the following claims.

I claim:

1. A directional signal switch for automobiles and like vehicles comprising an electric switch including a member moveable between a central "off" position and "on" positions at opposite sides of said "off" position; a rotatably mounted plate having a portion overlying the switch member and operatively connected thereto, means pivotally mounting said rotatably mounted plate for movement about a pair of pivot points at opposite sides of the "off" position of the switch, a second plate carried by said rotatably mounted plate, resilient means normally urging said second plate toward a forward limit position with respect to the rotatably mounted plate, and a pair of actuator elements rotatably carried by the second plate at respectively opposite sides thereof arranged when the second plate and switch are in either of said "on" positions to be relatively projected for engagement in one direction to effect actuation of the rotatably mounted plate, second plate and switch to the central "off" position.

2. A directional signal switch for automobiles and like vehicles comprising an electric switch including a member moveable between a central "off" position and "on" positions at opposite sides of said "off" position; a rotatably mounted plate having a portion overlying the switch member and operatively connected thereto, means pivotally mounting said rotatably mounted plate for rotary movement about a pair of pivot points at opposite sides of the "off" position of the switch, means to manually pivot the rotatably mounted plate selectively in opposite directions about one of said pivot points to actuate said switch from the "off" position to one of said "on" positions and about the other of said pivot points to the other of said "on" positions, a second plate carried by said rotatably mounted plate, and a pair of actuator elements rotatably carried by the second plate at respectively opposite sides thereof and arranged when the second plate and switch are in either of said "on" positions to be relatively projected for engagement in one direction to effect actuation of the rotatably mounted plate, second plate and switch to the central "off" position.

3. A directional signal switch for automobiles and like vehicles comprising an electric switch including a member moveable between a central "off" position and "on" positions at opposite sides of said "off" position; a rotatably mounted plate having a portion overlying the switch member and operatively connected thereto, means pivotally mounting said rotatably mounted plate for rotary movement about a pair of pivot points at opposite sides of the "off" position of the switch, means to manually pivot the rotatably mounted plate selectively in opposite directions about one of said pivot points to actuate said switch from the "off" position to one of said "on" positions and about the other of said pivot points to the other of said "on" positions, a second plate carried by said rotatably mounted plate, resilient means normally urging said second plate toward a forward limit position with respect to the rotatably mounted plate, and a pair of actuator elements rotatably carried by the second plate at respectively opposite sides thereof and arranged when the second plate and switch are in either of said "on" positions to be relatively projected for engagement in one direction to effect actuation of the rotatably mounted plate, second plate and switch to the central "off" position.

4. A directional signal switch for automobiles and like vehicles comprising a housing mounted about the steering column of the vehicle and an electrical switch including a member moveable between a central "off" position and "on" positions at opposite sides of said "off" position; a mounting plate secured within said housing, a pair of projections on said mounting plate positioned equi-distant at opposite sides of the "off" position of said electric switch, a rotatably mounted plate carried by said mounting plate in engagement with said projections in a central "off" position, means to selectively rotate said rotatably mounted plate from said "off" position to a right hand "on" position about one of said projections and to a left hand "on" position about the other of said projections, means interconnecting said rotatably mounted plate with the electric switch operable to actuate said switch upon similar actuation of the rotatably mounted plate, a third plate mounted on said rotatably mounted plate, and a pair of actuator elements rotatably carried by said third plate at respectively opposite sides thereof and arranged when the pawl plate, rotatably mounted plate and switch are in either of said "on" positions to be relatively projected for engagement in one direction to effect actuation of the third plate, rotatably mounted plate and switch to the central "off" position and for engagement in the opposite direction to rotate freely with respect to the third plate, rotatably mounted plate and switch without actuating the same.

5. A directional signal switch for automobiles and like vehicles comprising a housing mounted about the steering column of the vehicle and an electrical switch including a member moveable between a central "off" position and "on" positions at opposite sides of said "off" position; a mounting plate secured within said housing, a pair of projections on said mounting plate positioned equi-distant at opposite sides of the "off" position of said electric switch, a rotatably mounted plate carried by said mounting plate in engagement with said projections in a central "off" position, means to selectively rotate said rotatably mounted plate from said "off" position to a right hand "on" position about one of said projections and to a left hand "on" position about the other of said projections, means interconnecting said rotatably mounted plate with the electric switch operable to actuate said switch upon similar actuation of the rotatably mounted plate, a third plate resiliently mounted on said rotatably mounted plate, spring means operable normally to maintain said third plate in a forward limit position with respect to said rotatably mounted plate, and a pair of actuator elements rotatably carried by said third plate at respectively opposite sides thereof and arranged when the third plate, rotatably mounted plate and switch are in either of said "on" positions to be relatively projected for engagement in one direction to effect actuation of the third plate, rotatably mounted plate and switch to the central "off" position and for engagement in the opposite direction to rotate freely with respect to the third plate, rotatably mounted plate and switch without actuating the same.

6. A directional signal switch for automobiles and like vehicles comprising a housing mounted about the steering column of the vehicle and an electrical switch including a member moveable between a central "off" position and "on" positions at opposite sides of said "off" position; a mounting plate secured within said housing, a pair of projections on said mounting plate positioned equi-distant at opposite sides of the "off" position of said electric switch, a rotatably mounted plate carried by said mounting plate in engagement with said projections in a central "off" position, means to selectively rotate said rotatably mounted plate from said "off" position to a right hand "on" position about one of said projections and to a left hand "on" position about the other of said projections, guide means to direct rotary movement of the rotatably mounted plate about said projections, stops formed as integral parts of said mounting plate to limit relative movement of the rotatably mounted plate with respect thereto, means on said rotatably mounted plate in engagement with the electric switch operable to actuate said switch upon similar actuation of the rotatably mounted plate, a third plate resiliently mounted on said rotatably mounted plate, and a pair of actuator elements rotatably carried by said third plate at respectively opposite sides thereof and arranged when the third plate, rotatably mounted plate and switch are in either of said "on" positions to be relatively projected for engagement in one direction to effect actuation of the third plate, rotatably mounted plate and switch to the central "off" position and for engagement in the opposite direction to rotate freely with respect to the third plate, rotatably mounted plate and switch without actuating the same.

7. A directional signal switch for automobiles and like vehicles comprising a housing mounted about the steering column of the vehicle and an electrical switch including a member moveable between a central "off" position and "on" positions at opposite sides of said "off" position; a mounting plate secured within said housing, a pair of upwardly extending projections on said mounting plate positioned equi-distant at opposite sides of the "off" position of said electric switch, a rotatably mounted plate carried by said mounting plate in engagement with said projections in a central "off" position, means to selectively rotate said rotatably mounted plate from said "off" position to a right hand "on" position about one of said projections and to a left hand "on" position about the other of said projections, guide means to direct rotary movement of the rotatably mounted plate about said projections, a detent spring engaged between said rotatably mounted plate and said mounting plate operable to resiliently maintain the rotatably mounted plate in the neutral position and in the right and left hand limit positions, means on said rotatably mounted plate in engagement with the electric switch operable to actuate said switch upon similar actuation of the rotatably mounted plate, a third plate resiliently mounted on said rotatably mounted plate, spring means operable normally to maintain said third plate in a forward limit position with respect to said rotary plate, and a pair of actuator elements rotatably carried by said third plate at respectively opposite sides thereof and arranged when the third plate, rotatably mounted plate and switch are in either of said "on" positions to be relatively projected for engagement in one direction to effect actuation of the third plate, rotatably mounted plate and switch to the central "off" position and for engagement in the opposite direction to rotate freely with respect to the third plate, rotatably mounted plate and switch without actuating the same.

8. A direcional signal switch for automobiles and like vehicles comprising an electric switch including a member movable between a central "off" position and "on" positions at opposite sides of said "off" position; a mounting plate secured to the signal switch a rotatably mounted plate having a portion overlying the switch member and operatively connected thereto, means pivotally mounting said rotatably mounted plate for rotary movement about a pair of pivot points at opposite sides of the "off" position of the switch, a detent spring having one end anchored to the mounting plate and the other end secured to the rotatably mounted plate, said other end of the spring actuatable upon movement of the rotatably mounted plate to an "on" position to pass over a line interconnecting the anchor point of the spring with the pivot for the rotatably mounted plate and exert a force on the rotatably mounted plate in a direction outwardly of said pivot and resiliently maintain said rotatably mounted plate in the "on" position, a third plate carried by said rotatably mounted plate, and a pair of actuator elements rotatably carried by the third plate at respectively opposite sides thereof and arranged when the third plate and switch are in either of said "on" positions to be relatively projected for engagement in one direction to effect actuation of the rotatably mounted plate, third plate and switch to the central "off" position.

9. A directional signal switch for automobiles and like vehicles comprising an electric switch including a member movable between a central "off" position and "on" positions at opposite sides of said "off" position; a mounting plate secured to the signal switch a rotatably mounted plate having a portion overlying the switch member and operatively connected thereto, means pivotally mounting said rotatably mounted plate for rotary movement about a pair of pivot points at opposite sides of the "off" position of the switch, a detent spring having one end anchored to the mounting plate and the other end secured to the rotatably mounted plate, said other end of the spring actuatable upon movement of the rotatably mounted plate to an "on" position to pass over a line interconnecting the anchor point of the spring with the pivot for the rotatably mounted plate and exert a force on the rotatably mounted plate in a direction outwardly of said pivot and resiliently maintain said rotatably mounted plate in the "on" position, a third plate carried by said rotatably mounted plate, resilient means normally urging said third plate toward a forward limit position with respect to the rotatably mounted plate, and a pair of actuator elements rotatably carried by the third plate at respectively opposite sides thereof and arranged when the third plate and switch are in either of said "on" positions to be relatively projected for engagement in one direction to effect actuation of the rotatably mounted plate, third plate and switch to the central "off" position.

10. A directional signal switch for automobiles and like vehicles comprising an electric switch including a member movable between a central "off" position and "on" positions at opposite sides of said "off" position; a mounting plate secured to the signal switch a rotatably mounted plate having a portion overlying the switch member and operatively connected thereto, means pivotally mounting said rotatably mounted plate for rotary movement about a pair of pivot points at opposite sides of the "off" position of the switch, means to manually pivot the rotatably mounted plate selectively in opposite directions about one of said pivot points to actuate said switch from the "off" position to one of said "on" positions and about the other of said pivot points to the other of said "on" positions, a detent spring having one end anchored to the mounting plate and the other end secured to the rotatably mounted plate, said other end of the spring actuatable upon movement of the rotatably mounted plate to an "on" position to pass over a line interconnecting the anchor point of the spring with the pivot for the rotatably mounted plate and exert a force on the rotatably mounted plate in a direction outwardly of said pivot and resiliently maintain said rotatably mounted plate in the "on" position, a third plate carried by said rotor plate, and a pair of actuator elements rotatably carried by the third plate at respectively opposite sides thereof and arranged when the third plate and switch are in either of said "on" positions to be relatively projected for engagement in one direction to effect actuation of the rotatably mounted plate, third plate and switch to the central "off" position.

11. In an actuating mechanism for a directional signal switch for automobiles and like vehicles, the combination comprising an actuating arm extending laterally from a mounting adjacent the steering post, a signal actuating member having an intermediate portion thereof secured to said arm and having portions extending in opposite directions from said connection to said arm in a plane substantially perpendicular to said steering post and adjacent thereto, pivotal supports for said actuating member spaced arcuately from each other about said post in opposite directions from said connection, means controlled by the pivotal movement of said actuating member for actuating a switch element to indicate right and left turns, respectively, in the extreme positions of said member, and means resiliently mounted upon said member for lost-motion free movement in one direction and positive impelling relationship to said member in the other direction, said actuating member being connected to one of said pivotal supports through a lost-motion connection permitting limited rotation about the other pivotal support in one direction and to the other pivotal support through a lost-motion connection permitting limited rotation about said one support in the other direction, a projection from said steering post mounted in position to abut said resiliently mounted means in a direction to impart thereto said lost-motion free movement as said steering post rotates in a direction to make the turn indicated and to abut another portion of the same in the opposite direction of movement of said steering post to impart said impelling movement therethrough to said said actuating member to cancel the signal, and means to hold said actuating member resiliently in said respective extreme signal-actuating positions and in an intermediate off position, upon actuation thereof to any one of said positions.

12. An actuating mechanism as defined in claim 11, in which said means for holding said actuating member in extreme signal-actuating positions and said off position constitutes a spring having a portion secured for pivotal movement with said actuating member and a portion secured to a fixed support, said spring mounting being located relative to said pivotal supports to impart maximum distortion to said spring at one position of said actuator members between its off position and one of said extreme positions, and at another position thereof between its off position and the other of said extreme positions.

References Cited in the file of this patent

UNITED STATES PATENTS

| | | |
|---|---|---|
| 2,276,413 | Moore | Mar. 17, 1942 |
| 2,347,342 | Thirwell | Apr. 25, 1944 |
| 2,525,033 | Hollins | Oct. 10, 1950 |
| 2,542,242 | Fuller | Feb. 20, 1951 |
| 2,596,834 | Barcus | May 13, 1952 |
| 2,642,505 | Hept | June 16, 1953 |
| 2,643,308 | Lincoln et al. | June 23, 1953 |
| 2,657,287 | Lincoln et al. | Oct. 27, 1953 |

FOREIGN PATENTS

| | | |
|---|---|---|
| 508,252 | Great Britain | June 28, 1939 |